June 29, 1965  F. P. ADLER  3,191,546
MOVABLE BULKHEAD
Filed March 13, 1961  4 Sheets-Sheet 1
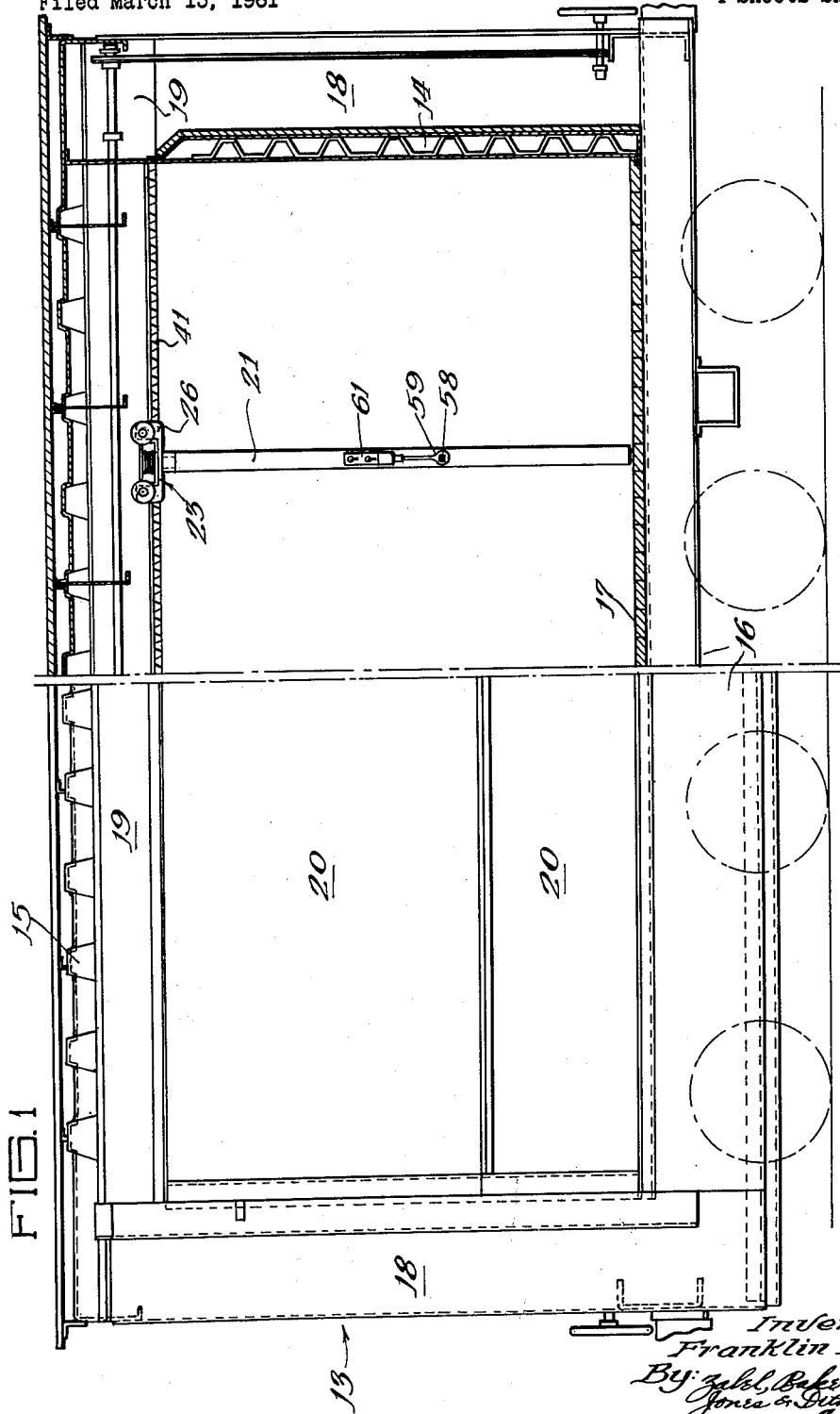

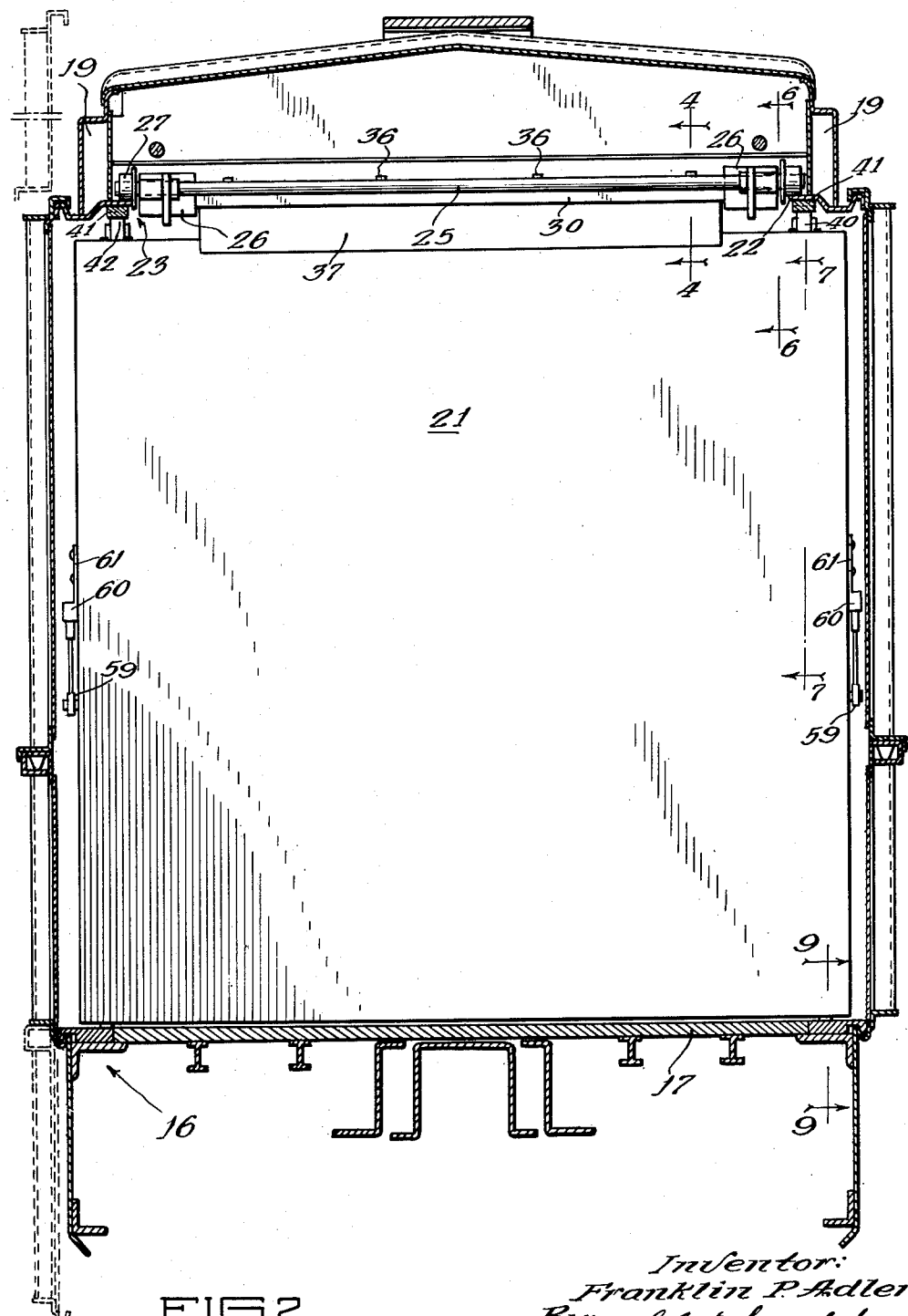

June 29, 1965   F. P. ADLER   3,191,546
MOVABLE BULKHEAD
Filed March 13, 1961   4 Sheets-Sheet 3
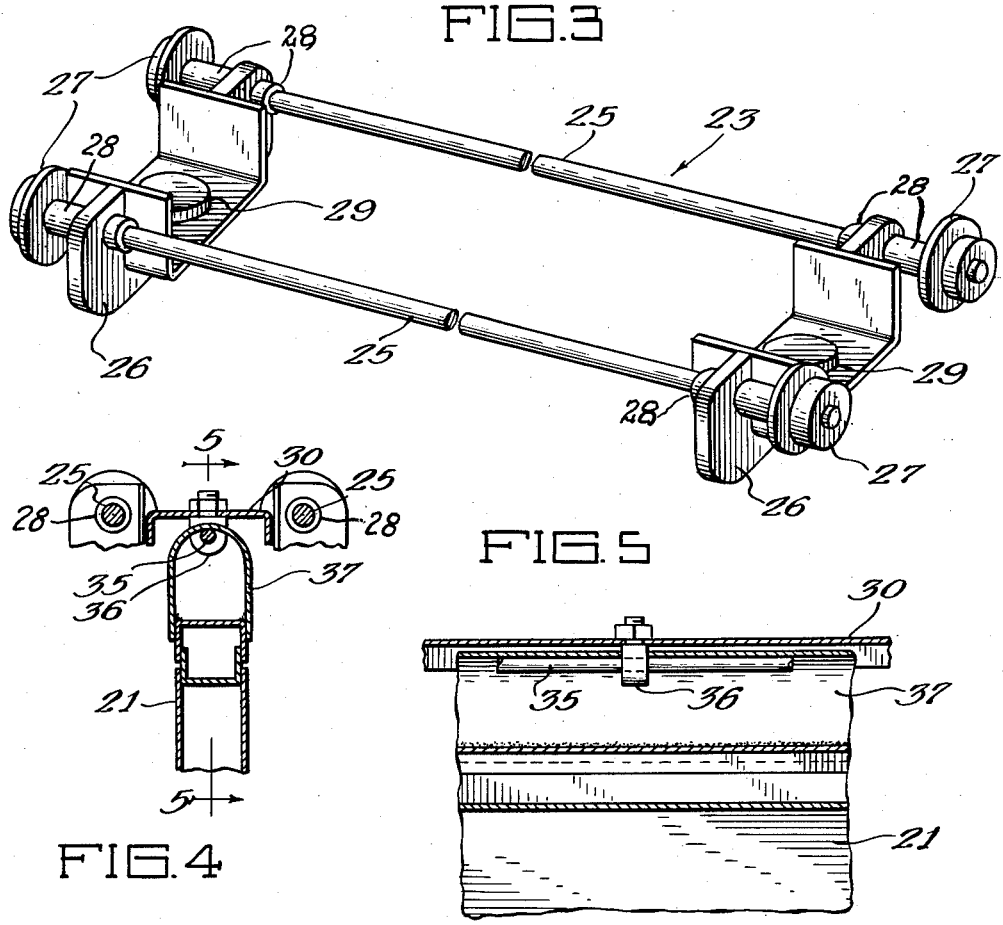
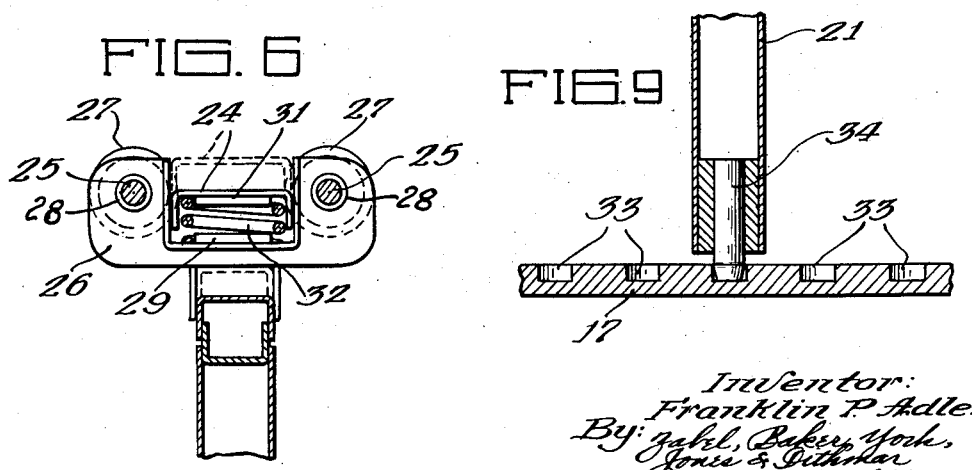
Inventor:
Franklin P. Adler
By: Gabel, Baker, York,
Jones & Outhwaite
Attorneys

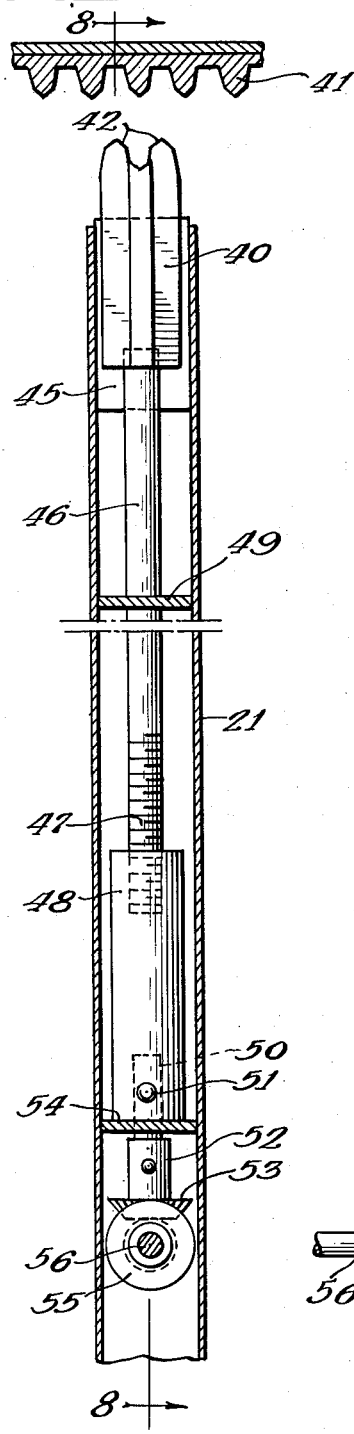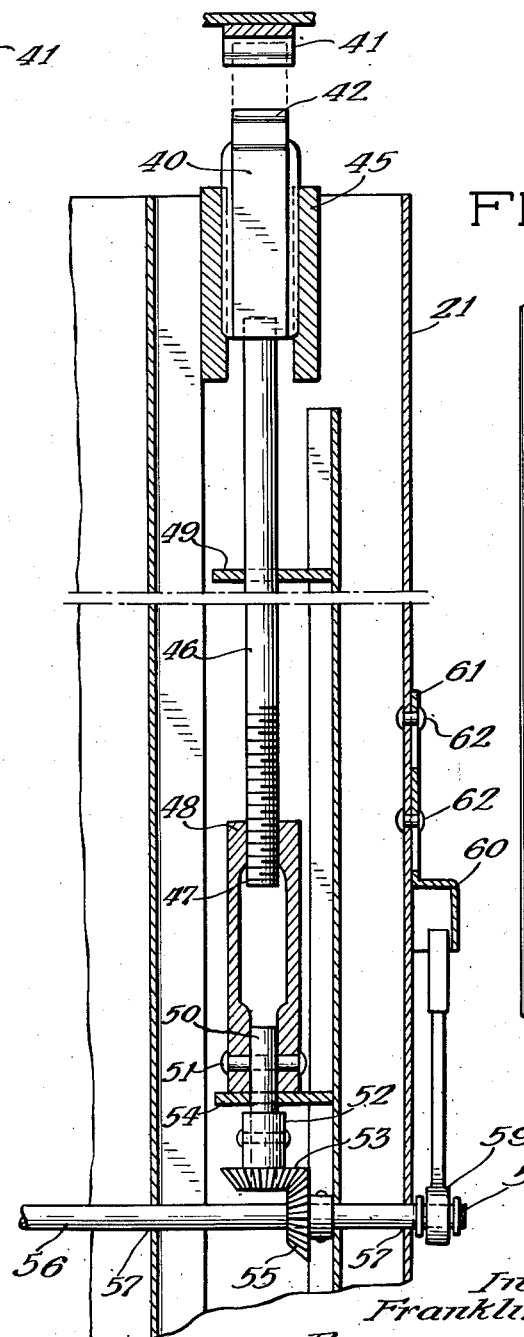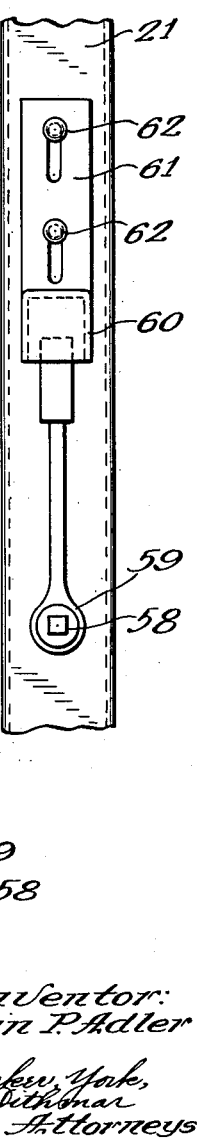

United States Patent Office 3,191,546
Patented June 29, 1965

3,191,546
MOVABLE BULKHEAD
Franklin P. Adler, Michigan City, Ind., assignor to Pullman Incorporated, Chicago, Ill., a corporation of Delaware
Filed Mar. 13, 1961, Ser. No. 95,335
7 Claims. (Cl. 105—376)

This invention relates to improvements in movable bulkheads which can serve as load dividers for freight cars and other cargo carriers.

The invention relates more specifically to a bulkhead which is so supported that it can easily be moved from place to place on rollers while its vertical orientation is maintained, and which also includes means for locking the same in its adjusted position.

The present invention is particularly well adapted for use in connection with an open side type of car as shown in the copending applications of Franklin P. Adler and James E. Candlin, Jr., Serial No. 89,033 filed February 13, 1961, now abandoned, and Franklin P. Adler, Serial No. 93,455, filed March 6, 1961, because the movable bulkhead is of considerable utility in direct loading, as pointed out in those applications. However, the present invention is applicable to other types of cargo carriers.

An object of my invention is to provide an arrangement in which the movable bulkhead can be suspended from a pair of tracks which extend for the full length of the cargo compartment of the freight car or other carrier, so that its position can readily be shifted while in a vertical position.

Another object is to provide a simplified and effective trolley construction for supporting the bulkhead.

Still another object is to provide improved means for locking the bulkhead in its adjustable position.

Other objects, features and advantages will become apparent as the description proceeds.

With reference now to the drawings in which like reference numerals designate like parts:

FIG. 1 is a side elevation of a freight car embodying my invention;
FIG. 2 is a vertical section thereof;
FIG. 3 is a perspective view of the trolley;
FIG. 4 is a vertical longitudinal section taken along line 4—4 of FIG. 2 showing the hinge connection between the bulkhead and the hanger channel;
FIG. 5 is a transverse section taken along line 5—5 of FIG. 4;
FIG. 6 is a vertical longitudinal section taken along line 6—6 of FIG. 2 showing the resilient mounting of the bulkhead on the trolley.
FIG. 7 is a vertical longitudinal section along line 7—7 of FIG. 2 showing the upper locking tooth and the operating mechanism therefor;
FIG. 8 is a vertical transverse section taken along line 8—8 of FIG. 7;
FIG. 9 is an enlarged vertical section taken along line 9—9 of FIG. 2 showing the lower locking pin and its cooperation with the floor of the car; and
FIG. 10 is an end view of the bulkhead.

With reference now to FIGS. 1 and 2, the reference numeral 13 designates generally a freight car of the open side type shown in the above applications, the car including end walls 14, a roof structure 15, an underframe 16, a floor 17 supported thereby, end piers 18 rigidly connected to the underframe, and compression members 19 which, together with the end piers 18 and underframe 16, form a part of the car structure. The compression members 19 extend for the full length of the car, and in the arrangement shown, also serve as the side plates which support the roof structure 15. The car also includes door means 20 for closing the open side.

One or more movable bulkheads 21 are located within the car and conform generally in shape and dimensions to the cross section of the cargo space. The bulkhead 21 is supported from horizontal flanges or tracks 22 which project inwardly from the compression members 19 by means of a trolley 23, shown in FIG. 3. Connection between the bulkhead and the trolley is made by laterally extending hangers 24 (FIG. 6) which, in the embodiment shown comprise the end portions of a hanger beam or channel 30 as will be hereinafter described.

The trolley 23, as shown in FIG. 3, comprises a pair of shafts 25 which extend the full width of the car, and which are connected to each other by yokes 26 in which the shafts may be journaled by suitable roller bearings. Mounted on the ends of both shafts are flanged rollers 27 which ride on the flanges 22. Suitable spacers and collars 28 are provided to maintain the relative positions of the parts. Therefore, it will be seen that the trolley is a separate unit which can ride back and forth in the longitudinal direction upon the flanges or tracks 22. Means are provided to suspend the bulkhead 21 from the trolley, and also to permit vertical displacement thereof in connection with the locking means. A feature of the trolley construction is that it requires no separate frame member apart from the yokes 26 and the shafts 25.

Each yoke 26 is a U-shaped member which includes a horizontal platform having a raised portion which provides a spring seat 29. The hanger channel 30 has its end portions 24 located within the yokes 26, and the latter are formed with depressed portions providing a spring seat 29. A spring 32 is disposed between the same and hence urges the bulkhead 21 upwardly so that the lower edge will clear the floor 17 by an extent greater than that shown in FIG. 2.

As shown in FIG. 9, the floor 17 is provided with a series of holes 33 which are adapted to receive a pin 34 carried at the lower corner edge of the door. The hole and pin arrangement is duplicated for each side of the bulkhead, as are the other locking and operating mechanisms hereinafter described.

In operation, the springs 32 tend to urge the bulkhead 21 upwardly into a normal position in which the pins 34 clear the holes 33. Thus the bulkhead can be shifted back and forth. Operating means are provided to urge the bulkhead downwardly into the positions shown in FIGS. 1 and 2, in which the pins 34 are received within the holes 33, thus locking the bottom edge of the bulkhead 21 with respect to the floor 17.

In the embodiment shown, alignment of the bottom edge of the bulkhead with respect to the holes 23 is facilitated by providing a hinged connection between the body of the bulkhead 21 and the hanger channel 30. This hinged connection includes a hinge rod 35 which is supported from the hanger channel 30 by means of a plurality of brackets 36. The upper portion of the body of the bulkhead 21 is in the form of a shell 37, shown in FIG. 4, which rests on the hinge rod 35. Suitable openings are formed in the shell to accommodate the brackets 36, and the parts can be assembled by inserting the hinge rod 35 axially after the hanger channel 30 and the brackets 36 have been properly arranged with respect to the shell top 37.

In connection with the operating means which locks the bottom edge of the bulkhead to the floor, as above described, means are provided which engage the car structure at the upper edge of the bulkhead. Since the main thrust of the load on the bulkhead occurs primarily at the lower part of the bulkhead, positive locking means are required for the bottom edge of the bulkhead, but the engagement at the top edge may be either frictional or positive. In the arrangement shown, a positive lock may be provided at both the upper and lower edges or corners of the bulkhead.

This additional locking means comprises a toothed lug 40 which is slidably mounted in the bulkhead 21 so that it can be projected upwardly into engagement with a rack 41 formed on the under surface of the flange 22 of compression member 19. As shown in FIG. 7 the cooperating teeth of the rack 41 and lug 40 are tapered as indicated at 42 in order to provide a self centering arrangement which facilitates engagement. When the operating means of FIGS. 7 and 8 is actuated, the reaction of the toothed lug 40 against the rack 41 urges the bulkhead 21 downwardly so that the pins 34 enter the holes 33 to lock the bottom edge of the bulkhead.

As shown in FIGS. 7 and 8, the toothed lug 40 is slidably mounted in a guide 45 which is in the form of a casting which forms a part of the bulkhead structure. The toothed lug 40 is mounted at the upper end of a stem 46, the lower end of which is threaded as at 47 and cooperates with nut means, such as the threaded end of a rotatably mounted cage 48. One or more guides 49 may be provided for the stem 46.

Means are provided for rotating the cage 48 so as to urge the stem 46 and toothed lug upwardly. The cooperation between the toothed lug 40 and the guide 45 prevents the stem 46 from rotating. The cage 48 is in the form of a turnbuckle part, in the upper threaded opening of which is received the threaded stem 46, and in the lower opening of which is nonrotatably mounted a short shaft 50 which is pinned to the cage at 51. On the lower end of the shaft 50 is pinned the hub 52 of a beveled gear 53. The shaft 50 passes through the reaction plate 54 which forms a part of the bulkhead structure and which is engaged by the lower edge of the cage 48 so that the downward thrust developed by the cooperation of the cage 48 and threaded stem 46 may be transmitted to the bulkhead 21.

The beveled gear 53 is rotated by a driving beveled gear 55 which is mounted at the end of a horizontal shaft 56, the latter being journaled in the bulkhead structure at points 57.

The outer end of the shaft 56 projects beyond the side edge of the bulkhead 21 and is provided with a square end 58 which is engaged by an operating handle, preferably in the form of a reversible ratchet wrench 59. This ratchet wrench arrangement facilitates operation of the mechanism and also permits the shank of the same to be disposed vertically when not in use. As shown in FIGS. 8 and 10, the upper end of the wrench is engaged by a retainer 60, which is slidably mounted on the edge of the bulkhead by means of a slotted plate 61 and pins 62.

The operating mechanism is duplicated for each side of the bulkhead, but preferably the shaft 56 extends transversely for the full width of the bulkhead and is common to both operating mechanisms. Thus both sides of the bulkhead can be locked or unlocked simultaneously by actuation of only one of the operating handles or ratchet wrenches 59, provided that the ratchet of the other wrench is released or reversed.

The ratchet wrenches 59 preferably are permanently secured to the shaft ends 58.

Although only the preferred embodiment of my invention has been shown and described herein, it will be understood that various modifications and changes may be made in the construction shown without departing from the spirit of my invention as pointed out in the appended claims.

I claim:

1. A movable bulkhead for the cargo compartment of a cargo carrier, said compartment having a pair of spaced tracks extending along the upper portion thereof, comprising a trolley riding on said tracks for supporting said bulkhead, interlocking means located on the bottom edge of said bulkhead for locking said bottom edge to the floor of said compartment against horizontal movement, said floor being provided with means for receiving said interlocking means, means for suspending said bulkhead from said trolley, resilient means disposed between said bulkhead and said trolley for urging said bulkhead upwardly so that said interlocking means will normally be maintained in disengaged relationship, and operating means carried by said bulkhead and reacting upwardly against an adjacent portion of the structure of said cargo compartment for urging said bulkhead downwardly against the force of said resilient means in order to cause engagement of said bottom edge interlocking means with said floor, said operating means including a lug mounted for vertically sliding movement in the upper edge of said bulkhead and located for engagement with a portion of the structure of said cargo compartment, a screw threaded stem secured to and extending downwardly from said lug, means preventing rotation of said stem about its axis, rotatable nut means threaded onto said threaded stem, a reaction plate forming part of the structure of said bulkhead and engaged by said nut means, and means for rotating said nut means to effect vertical movement of said lug.

2. A movable bulkhead as claimed in claim 1 in which said bulkhead includes means for locking the upper part of said bulkhead to said compartment structure against horizontal movement.

3. A movable bulkhead as claimed in claim 1 in which said nut rotating means comprises a horizontally extending shaft having a noncircular end portion projecting beyond the end surface of said door, a reversible ratchet wrench engaging said end portion, and retainer means engaging the handle end of said ratchet wrench for maintaining it in a vertical position during periods of non-use.

4. A movable bulkhead construction for a cargo compartment having a pair of spaced tracks extending along the upper portion of the side walls thereof comprising a bulkhead, a bulkhead supporting trolley spanning the distance between and riding on said tracks, said trolley comprising two U-shaped yokes, one at each end, and each yoke providing a supporting platform, a pair of rollers supported by each yoke, and means connecting said yokes to each other, said bulkhead having laterally extending hangers located at the upper corner portions thereof and received in said yokes and overlying said platforms, a coil spring disposed between each supporting platform and one of said hangers and oriented for normally urging said bulkhead to a raised position and resiliently supporting said bulkhead from said trolley, operating means on said bulkhead and reacting against the structure of said cargo compartment for urging said bulkhead downwardly against the force of said coil spring so that the bottom edge of said bulkhead will engage the floor of said compartment, and locking means locking the upper and lower edges of said bulkhead with respect to said tracks and said compartment floor respectively for locking said bulkhead in a desired transverse position.

5. A movable bulkhead construction as claimed in claim 4 in which said laterally extending hangers comprise the opposite end portions of a hanger beam which extends from one yoke to the other, and means providing a horizontally extending hinged connection between said bulkhead and said hanger beam.

6. A movable bulkhead construction as claimed in claim 4 in which said locking means comprises a fixed pin projecting from the bottom edge of said bulkhead, cooperating means on the floor of said compartment to receive said pin, a projectible lug slidably mounted at the upper edge of said bulkhead and actuated by said operating means, and means formed on the underside of said tracks to receive said projectible lug so that said vertical orientation of said bulkhead can be maintained by said locking means.

7. A movable bulkhead construction as claimed in claim 4 in which said trolley includes two shafts journalled at opposite ends in said yokes, each shaft connecting a roller of one pair of rollers with a corresponding roller of the other pair, collar means for each end of each shaft for maintaining the relative axial spacing of said shafts with respect to said yokes, said shafts and collar means constituting said yoke connecting means.

References Cited by the Examiner

UNITED STATES PATENTS

| | | | |
|---|---|---|---|
| 809,481 | 1/06 | Whittemore | 104—98 |
| 1,902,823 | 3/33 | Bender | 105—218 |
| 2,360,029 | 10/44 | Wieden | 105—376 |
| 2,474,563 | 6/49 | Wieden et al. | 105—376 |
| 2,517,823 | 8/50 | Angel | 105—376 |
| 2,543,143 | 2/51 | Wells | 105—376 |
| 2,603,167 | 7/52 | Webster et al. | 105—369 |
| 2,866,419 | 12/58 | Candlin | 105—376 |
| 3,018,741 | 1/62 | Loomis et al. | 105—376 |
| 3,095,830 | 7/63 | Runken | 105—376 |

MILTON BUCHLER, *Primary Examiner.*

JAMES S. SHANK, LEO QUACKENBUSH, *Examiners.*